March 11, 1930.　　　W. K. ANDERSON　　　1,749,868
AUTOMOBILE MIRROR
Filed April 21, 1926
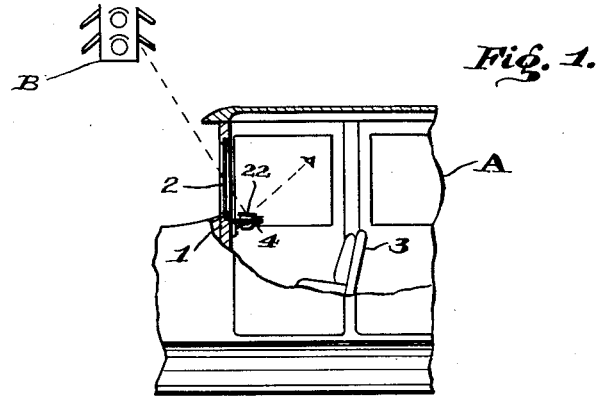
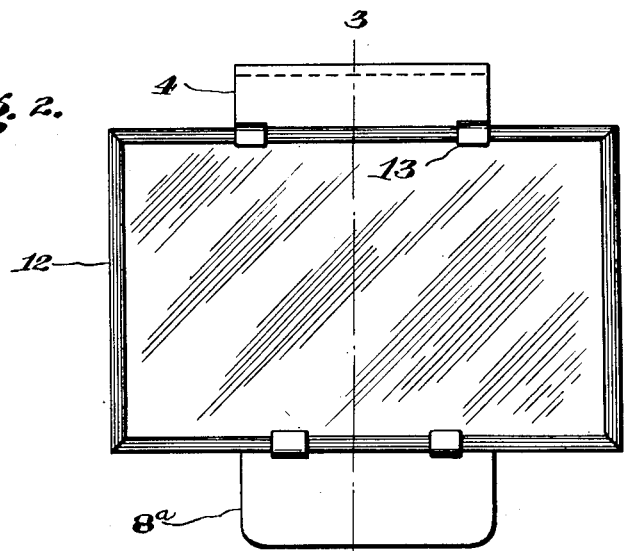
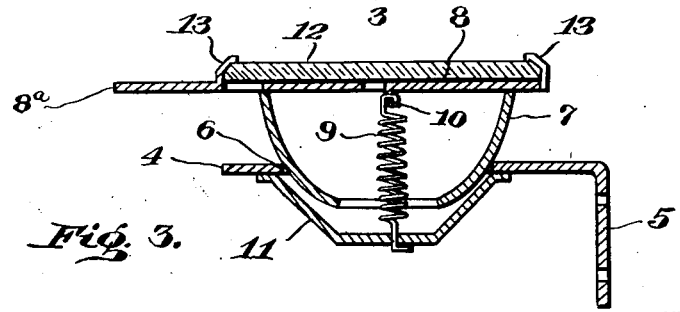
INVENTOR.
W. K. Anderson
BY
Robb Robb Hill
ATTORNEYS Patented Mar. 11, 1930

1,749,868

UNITED STATES PATENT OFFICE

WILLIAM K. ANDERSON, OF CLEVELAND, OHIO

AUTOMOBILE MIRROR

Application filed April 21, 1926. Serial No. 103,427.

The present invention relates in general to motor vehicles, and more particularly to a mirror attachment which embodies novel features of construction whereby the driver of the vehicle can see an over head object such as a traffic signal which could not otherwise be seen without leaning forward or putting his head out of a window so that he could see around the edge of the top of the car.

Further objects of the invention are to provide a mirror device of this character which is comparatively simple and inexpensive in its construction, which can be readily applied to the dash-board of the vehicle in operative position for use, and which admits of a quick adjustment of the mirror in all directions in order to bring it into proper position to reflect the overhead object in such a manner as to render it visible to the driver of the vehicle.

While one particular embodiment of the invention will be shown and described for illustrative purposes, it will be understood that many modifications and changes can be made in the details of construction without departing from the spirit of the invention.

For a full understanding of the invention reference is to be had to the following description and accompanying drawings in which, Figure 1 is a side elevation of a portion of a motor vehicle showing the device as mounted therein and properly adjusted to enable the driver of the car to see an over head traffic signal which would otherwise be rendered invisible by the top of the vehicle, portions being broken away and shown in section to show the interior of the vehicle.

Figure 2 is an enlarged top plan view of the mirror device, and

Figure 3 is a longitudinal sectional view through the same on the line 3—3 of Figure 2.

Corresponding and like parts are referred to in the following description and indicated on all of the views of the drawings by like reference characters.

The use of over head signals for directing traffic at street intersections has become almost universal, and while these over head signals can be clearly seen by drivers of motor vehicles when they are at a distance therefrom, it is frequently very difficult for a driver to see one of these over head signals when he is close to the same, for the reason that his vision is cut off by the top of the vehicle. Under such circumstances the driver must either lean forward or put his head through one of the side windows in order to see the signal. This is inconvenient and annoying and tends to detract his attention from other traffic conditions which require close watching for safe driving.

This difficulty is overcome by the use of the present attachment which is mounted on the inner side of the dash-board just below the windshield, so that it can be readily adjusted to reflect an image of the overhead traffic signal into the eyes of the driver. The traffic signal can thus be watched without the necessity of a lot of contortions on the part of the driver.

For illustrative purposes the mirror attachment is shown by Figure 1 as mounted in operative position on the dash-board 1 of a conventional construction of motor vehicle A. The mirror attachment is arranged just below the windshield 2, and, as will be hereinafter more clearly set forth, it can be quickly adjusted to bring the mirror into the necessary angle to enable the driver who may be sitting in the front seat 2 to obtain a vision of an over head traffic signal such as that shown at B, which is so close to the vehicle that direct vision thereof is shut off from the driver by the top of the vehicle.

Referring to Figures 2 and 3, the numeral 4 designates a supporting plate which is adapted to be rigidly mounted in position on the dash-board by means of the depending arm 5 at one end thereof. Suitable fastening members such as screws or the like may be employed for securing the arm 5 to the dash-board and the plate 4 then projects rearwardly therefrom in a substantially horizontal position and is held rigidly in position. The supporting plate has a circular opening 6 therein which partially receives and provides a bearing for a substantially semi-spherical bearing member 7 which projects downwardly from a mirror plate 8. The bearing member 7 is hollow and open at the bottom thereof and a tension spring 9 extends through the bearing member, having the upper end thereof connected to an ear 10 which is stamped from the mirror plate 8 and pressed downwardly therefrom, while the lower end thereof is secured to a U-shaped bracket 11 which is applied to the bottom of the supporting plate 4 and extends across the opening 6 therein.

A mirror 12 of a suitable size and shape is mounted upon the mirror plate 8, being held firmly in position thereon by means of the tongues or claws 13 which project from the plate and fit over opposite edges of the mirror. The mirror plate 8 is formed with a forward extension 8ª which constitutes a finger piece for quick manipulation of the mirror.

The tension of the spring 9 holds the rounded bearing member 7 in a firm frictional engagement with the edges of the opening 6 in the supporting plate 4, so that the parts will remain in an adjusted position, although the mirror can be readily tilted into any desired angle by forcibly moving the same. The hollow bearing member 7 provides a housing for the spring 9 and the edges of the opening in the bottom thereof cooperate with the spring to limit the tilting movement of the mirror. When the driver of the vehicle desires to see an overhead object such as a traffic signal which is so close to the vehicle that direct vision thereof is shut off by the vehicle top, he merely reaches forward to grasp the finger piece 8ª and tilts the mirror until the vision of the desired object is obtained. This can be quickly done and avoids the inconvenience and annoyance of leaning forward or putting his head out of a side window.

Having thus described my invention what I claim as new and desire to secure by Letters Patent is:

1. A device of the character described, including a supporting plate having a circular opening therein, a bracket arranged under the opening, a mirror plate, a hollow semi-spherical bearing member projecting from the mirror plate and extending partially through the opening in the supporting plate, said bearing member having an enlarged opening in the end thereof, a tension spring extending through the opening of the hollow bearing member and yieldably connecting the mirror plate directly to the bracket, whereby the bearing member is held in a frictional direct engagement with the edges of the opening in the supporting plate and has a universal adjustment therein, and a mirror on the mirror plate.

2. A device of the character described, including a horizontally disposed supporting plate having a circular opening therein, a lateral arm at one end of the supporting plate for engagement with a support, a U-shaped bracket applied to the bottom of the supporting plate and arranged below the opening therein, a mirror plate, a semi-spherical bearing member projecting from the mirror plate and extending partially through the opening in the supporting plate, a yielding direct connection between the mirror plate and bracket, whereby the bearing member is held in a frictional direct engagement with the edges of the opening in the supporting plate and has a universal movement therein, and a mirror mounted on the mirror plate.

WILLIAM K. ANDERSON.